US011801749B2

(12) United States Patent
Cole

(10) Patent No.: US 11,801,749 B2
(45) Date of Patent: Oct. 31, 2023

(54) IMAGE CAPTURE AND DISPLAY SYSTEM

(71) Applicant: Envisics Ltd, Milton Keynes (GB)

(72) Inventor: Alexander Cole, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 449 days.

(21) Appl. No.: 16/860,632

(22) Filed: Apr. 28, 2020

(65) Prior Publication Data

US 2020/0338986 A1 Oct. 29, 2020

(30) Foreign Application Priority Data

Apr. 29, 2019 (GB) ..................................... 1905975

(51) Int. Cl.
*B60K 35/00* (2006.01)
*B60R 1/00* (2022.01)

(52) U.S. Cl.
CPC ................ *B60K 35/00* (2013.01); *B60R 1/00* (2013.01); *B60K 2370/29* (2019.05);
(Continued)

(58) Field of Classification Search
CPC ............ B60K 2370/29; B60K 2370/31; B60K 2370/21; B60K 2370/334; B60K 35/00; B60K 2370/176; B60K 2370/1868; B60K 2370/52; B60K 2370/797; B60K 2370/152; B60K 2370/1526; B60K 2370/1529; B60K 2370/1531; B60K 2370/1533; B60K 2370/736; B60K 2370/739; B60R 1/00;
(Continued)

(56) References Cited

U.S. PATENT DOCUMENTS 8,576,286 B1 * 11/2013 Childs .................... G01C 21/00
382/104
2010/0067118 A1 * 3/2010 Takahashi .............. G02B 27/01
359/633
(Continued)

FOREIGN PATENT DOCUMENTS

DE 102016220965 4/2018
WO WO96/38319 12/1996

OTHER PUBLICATIONS

UK Search Report for GB 1905975.7 dated Nov. 2, 2019, 5 pages.

*Primary Examiner* — Nathnael Aynalem
(74) *Attorney, Agent, or Firm* — McDonnell Boehnen Hulbert & Berghoff LLP

(57) ABSTRACT

A system, such as a driver assistance system, arranged to form images of outside a vehicle for viewing from an eye box region within the vehicle. The system comprises an image capture device, a picture generating unit and an optical element. The image capture device is arranged to be mounted to the vehicle. The image capture device is arranged to capture images outside the vehicle. The optical element is disposed in front of the replay plane. The optical element has a focal length. The distance between the replay plane and the optical element is less that the focal length of the optical element such that the optical element forms a virtual image of each picture for viewing from the eye box region. The picture generating unit may be a holographic projector. The holographic projector may be arranged to form pictures on a replay plane. Each picture may correspond to an image captured by the image capture device.

18 Claims, 9 Drawing Sheets

(52) U.S. Cl.
CPC ... *B60R 2300/103* (2013.01); *B60R 2300/205* (2013.01); *B60R 2300/8026* (2013.01)

(58) Field of Classification Search
CPC ........ B60R 2300/103; B60R 2300/205; B60R 2300/8026; B60R 2300/802; B60R 2300/8066; B60R 2300/70; B60R 2300/80; B60R 11/04; B60R 2001/1215; B60R 11/0235; B60R 2011/0276; H04N 7/181; G02B 27/01
USPC ......................................................... 348/148
See application file for complete search history.

(56) References Cited

U.S. PATENT DOCUMENTS

| | | | |
|---|---|---|---|
| 2011/0157667 A1* | 6/2011 | Lacoste ................ | G03H 1/0808 |
| | | | 359/9 |
| 2012/0224062 A1* | 9/2012 | Lacoste ................... | G09G 5/14 |
| | | | 348/148 |
| 2014/0078410 A1* | 3/2014 | Wang ..................... | G03B 21/16 |
| | | | 349/5 |
| 2015/0070502 A1 | 3/2015 | Murayama et al. | |
| 2015/0346491 A1* | 12/2015 | Christmas ............ | G03H 1/0808 |
| | | | 359/9 |
| 2017/0364028 A1* | 12/2017 | Christmas .............. | G02B 30/26 |
| 2018/0297522 A1 | 10/2018 | Omanovic et al. | |

* cited by examiner

IMAGE CAPTURE AND DISPLAY SYSTEM

CROSS REFERENCE TO RELATED APPLICATIONS

This application claims the benefit of priority of United Kingdom Patent Application no. 1905975.7, filed Apr. 29, 2019, which is hereby incorporated herein by reference in its entirety.

FIELD

The present disclosure relates to an image capture and display system. Some embodiments relate to a holographic display system and a holographic projection system. Some embodiments relate to a driver assistance system for forming images of a rear view of a vehicle for viewing by the driver. Some embodiments relate to a method of capturing and displaying images of a rear view of a vehicle for viewing by a driver.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector may be provided using the described technology. Such projectors have found application in head-up displays, "HUD", and head-mounted displays, "HMD", including near-eye devices, for example.

Conventional rear view mirrors of a vehicle allow a driver to observe what is happening to the rear of the vehicle. For example, a rear view mirror may be mounted centrally inside the vehicle, in front of the driver, which allows the driver to observe a view immediately behind the vehicle through the transparent rear windscreen or windshield. In addition, side or wing mirrors may be mounted outside on one or both sides of the vehicle, in front of the driver, which allow the driver to observe rear views to the sides of the vehicle through the transparent side windows. However, conventional rear view mirrors require a line of sight to the rear view, as well as line of sight from the mirrors to the driver.

It has been proposed to use a rear view camera, having line of sight to the rear of a vehicle, to capture images and to display the captured images on a display screen in real time in place of conventional rear view mirrors. However, the use of a display screen instead of a rear view mirror may cause the driver visual difficulties and potentially eye strain. In particular, since the display screen is located closer to the driver than the view in front of the vehicle, the driver's eyes must adjust to alternately view (i) a far focal point/distance, when viewing the front view such as the road ahead, consistent with "distance vision", and (ii) a near focal point/distance, when viewing the rear view on the display screen, consistent with "near vision". Furthermore, a driver requiring eyesight correction and using spectacles (or contact lenses) with single vision distance lenses for driving may not be able to view the display screen clearly.

The present disclosure proposes an arrangement that mitigates at least some of the aforementioned disadvantages. There is disclosed herein a driver assistance system comprising an image capture and display system. The image capture and display system is arranged to form images of a view outside a vehicle, which can be viewed from an eye box region inside the vehicle with improved viewing experience.

SUMMARY

Aspects of the present disclosure are defined in the appended independent claims.

In some aspects, the present disclosure is implemented using a holographic projection system, as described herein. However, the present disclosure may be implemented using any picture generating unit that displays pictures on a plane. In other aspects, the present disclosure is implemented using a conventional (e.g. backlit) display device, such as an LCD or DLP.

There is disclosed herein a system arranged to form images of outside a vehicle for viewing from an eye box region within the vehicle. The system may be a vehicle display system or a driver assistance system.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The replay plane may have some curvature. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same or similar reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
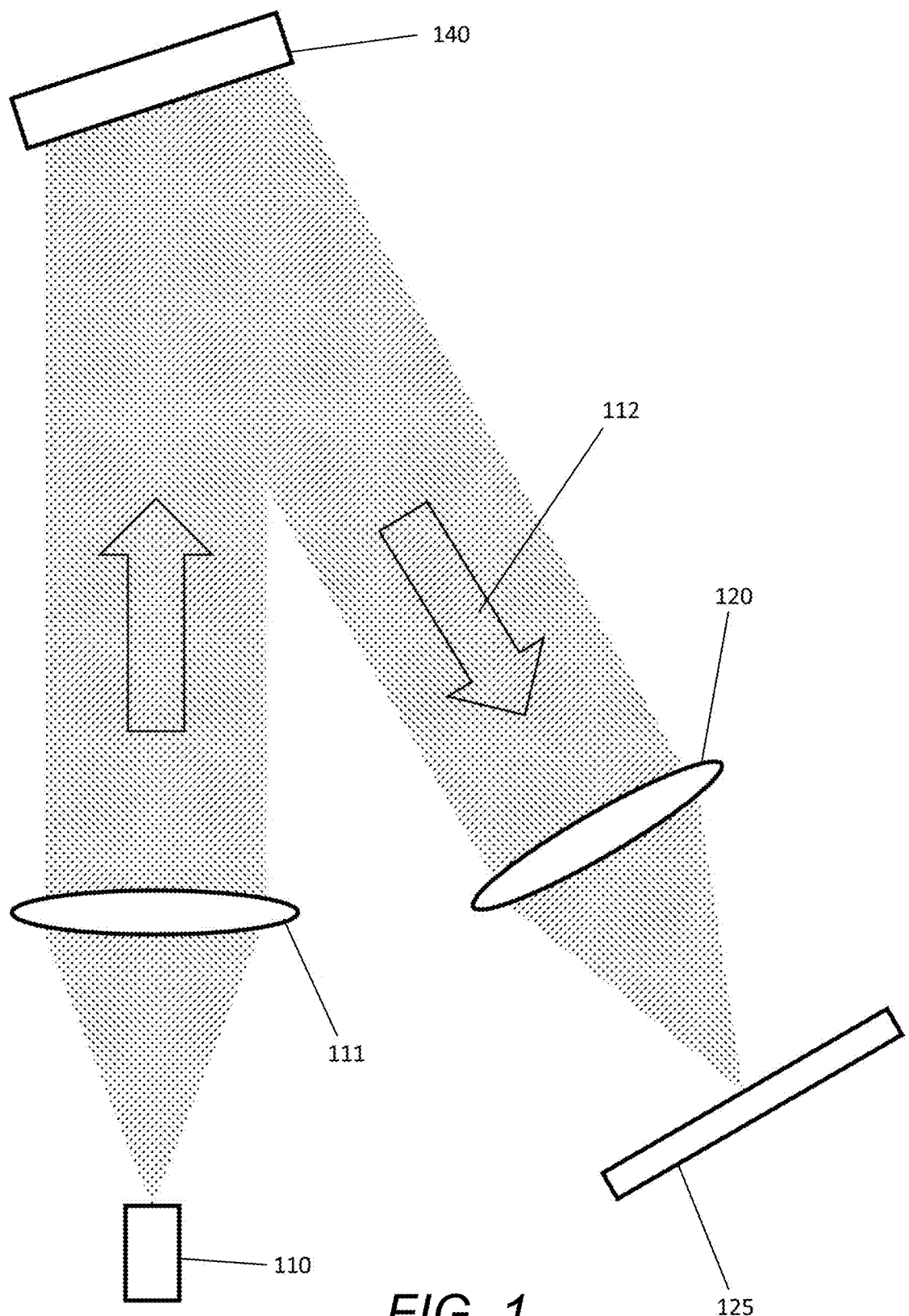
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
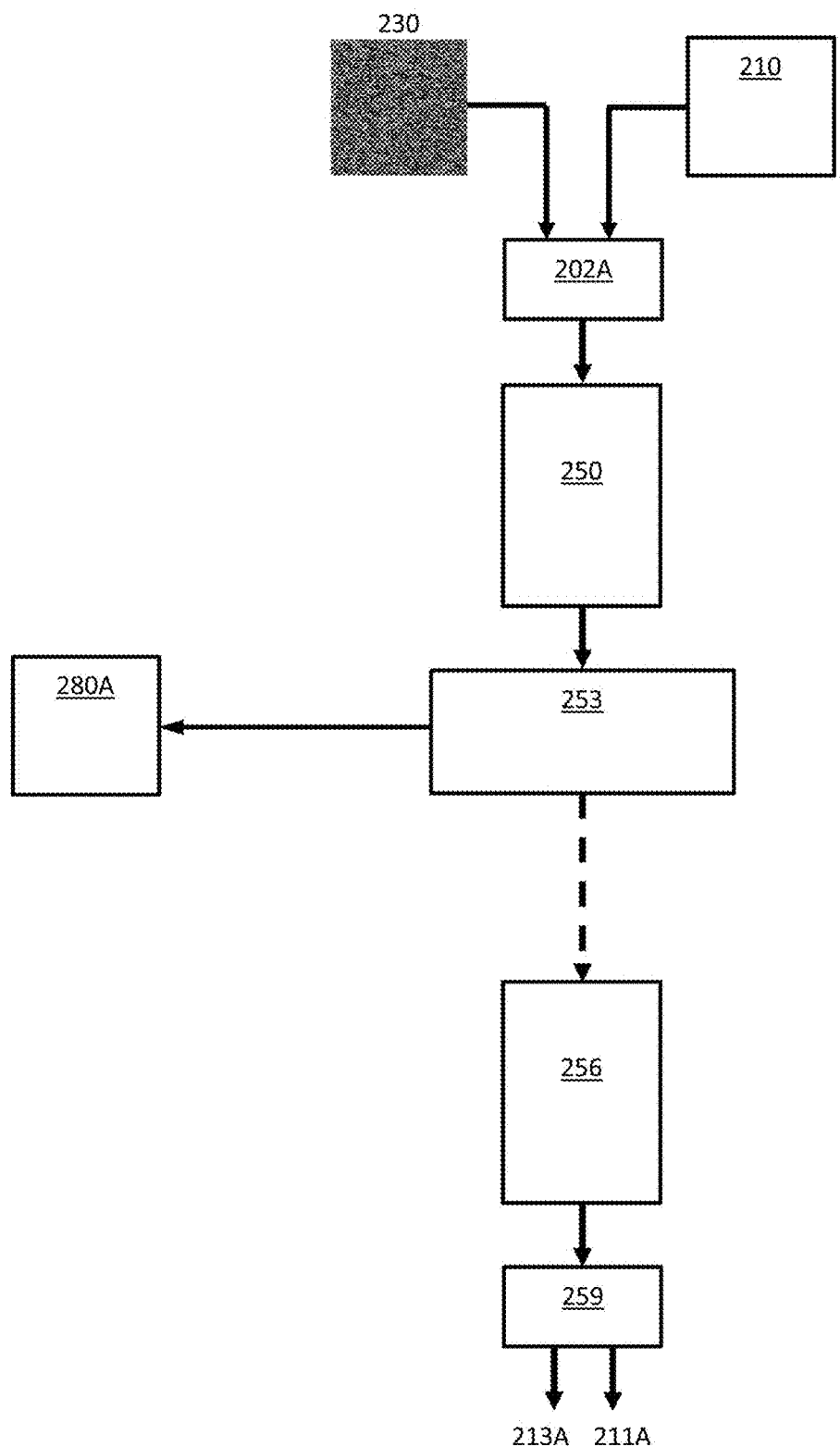
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
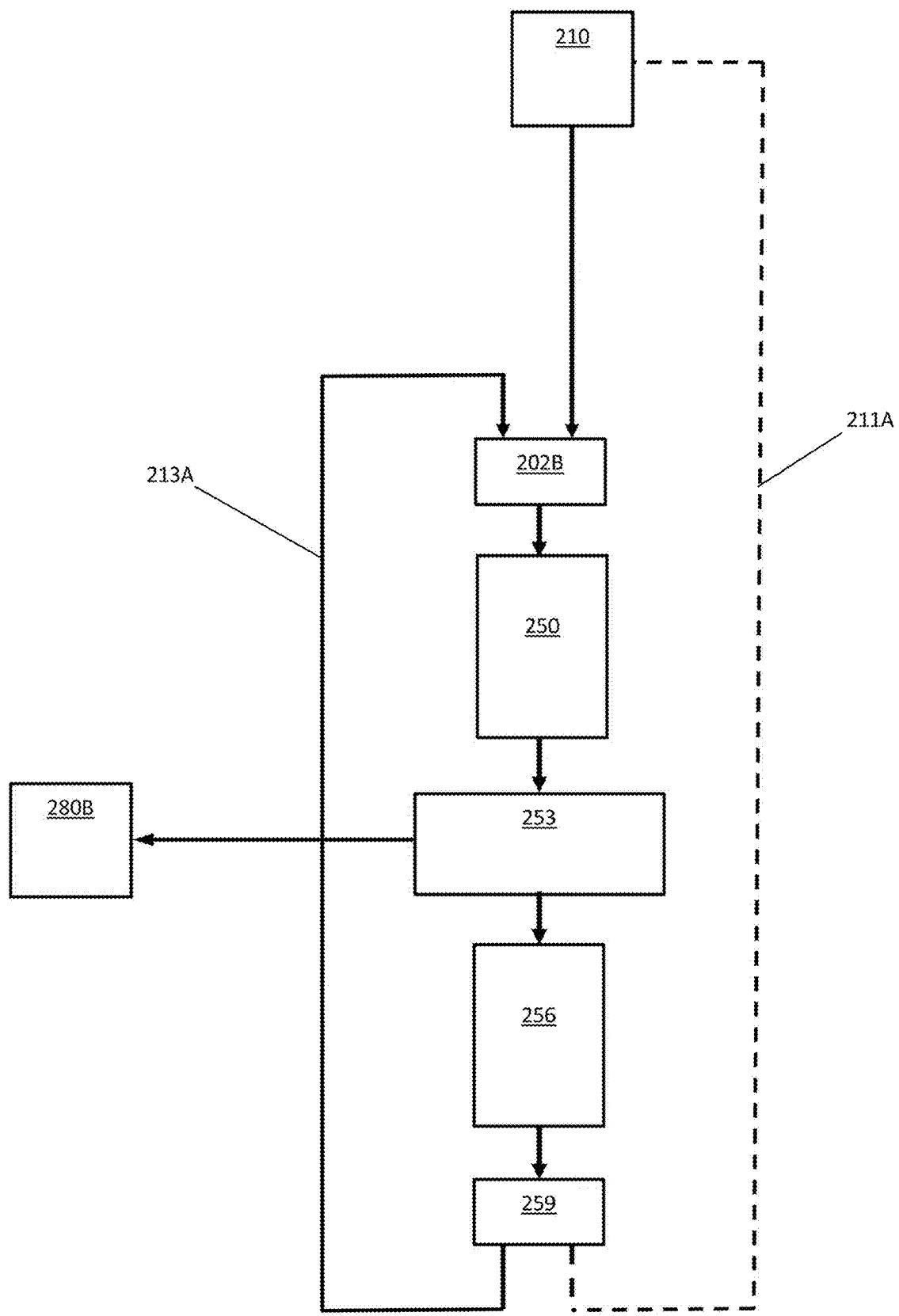
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
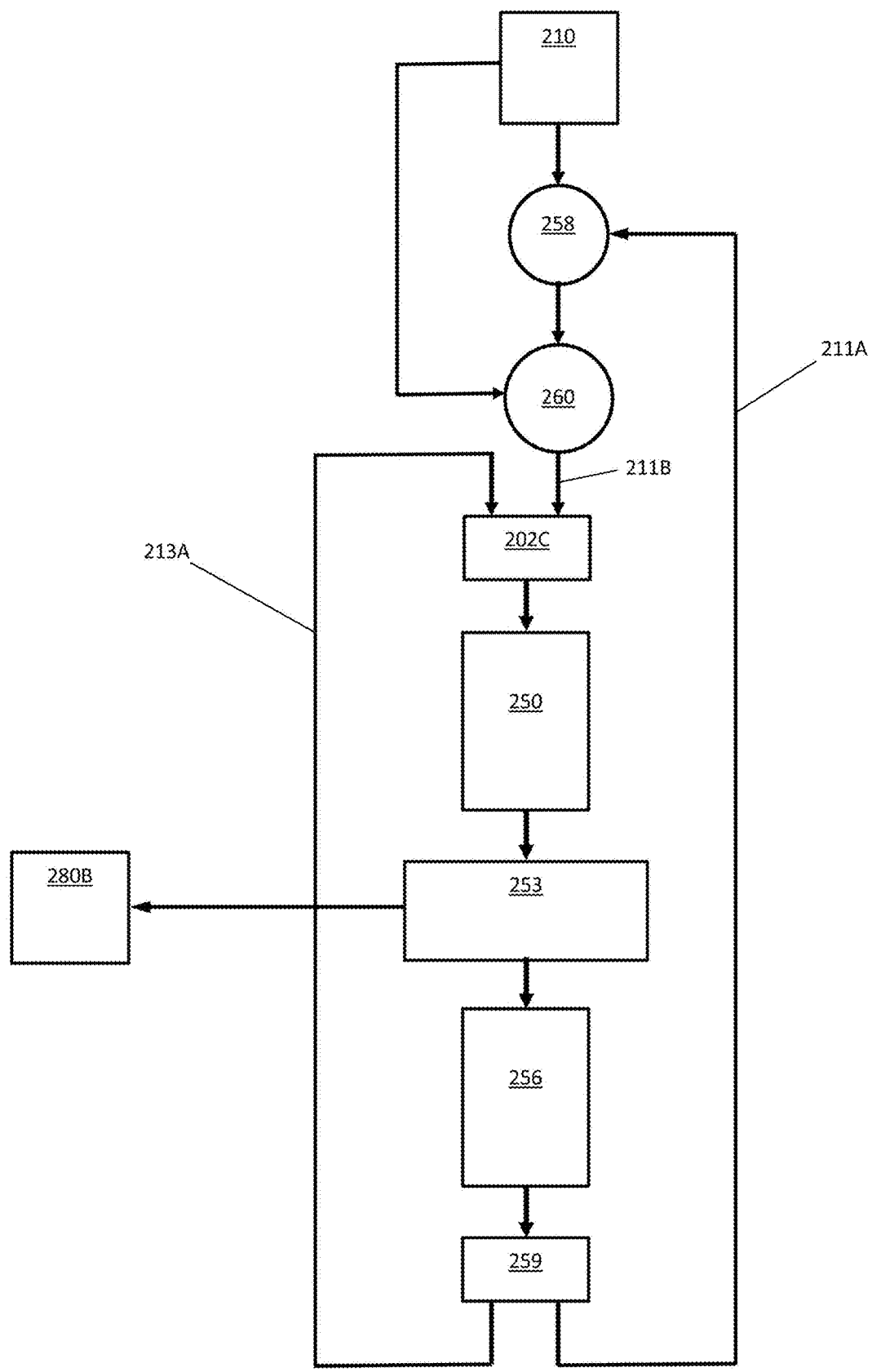
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i \angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
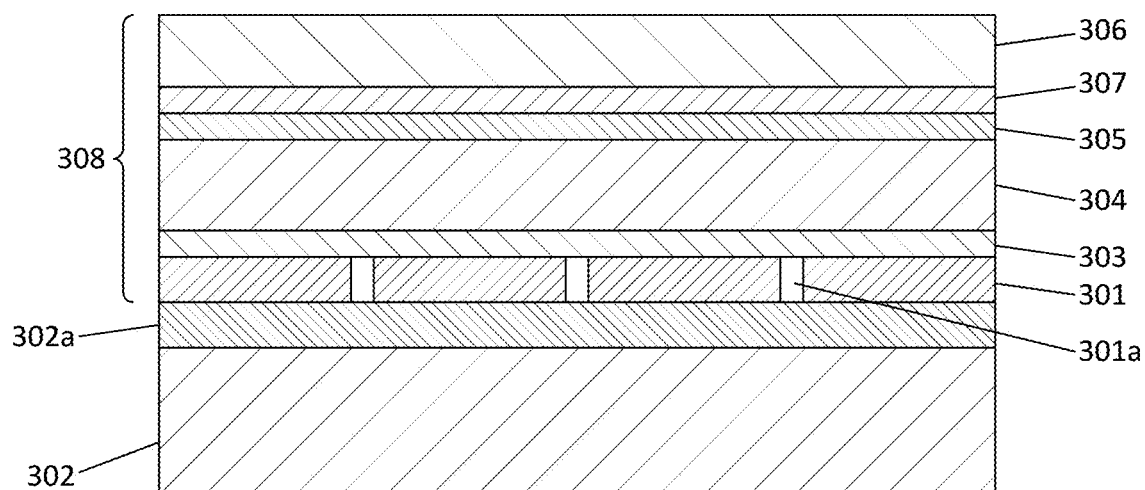
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Capture and Display

Figure 4:
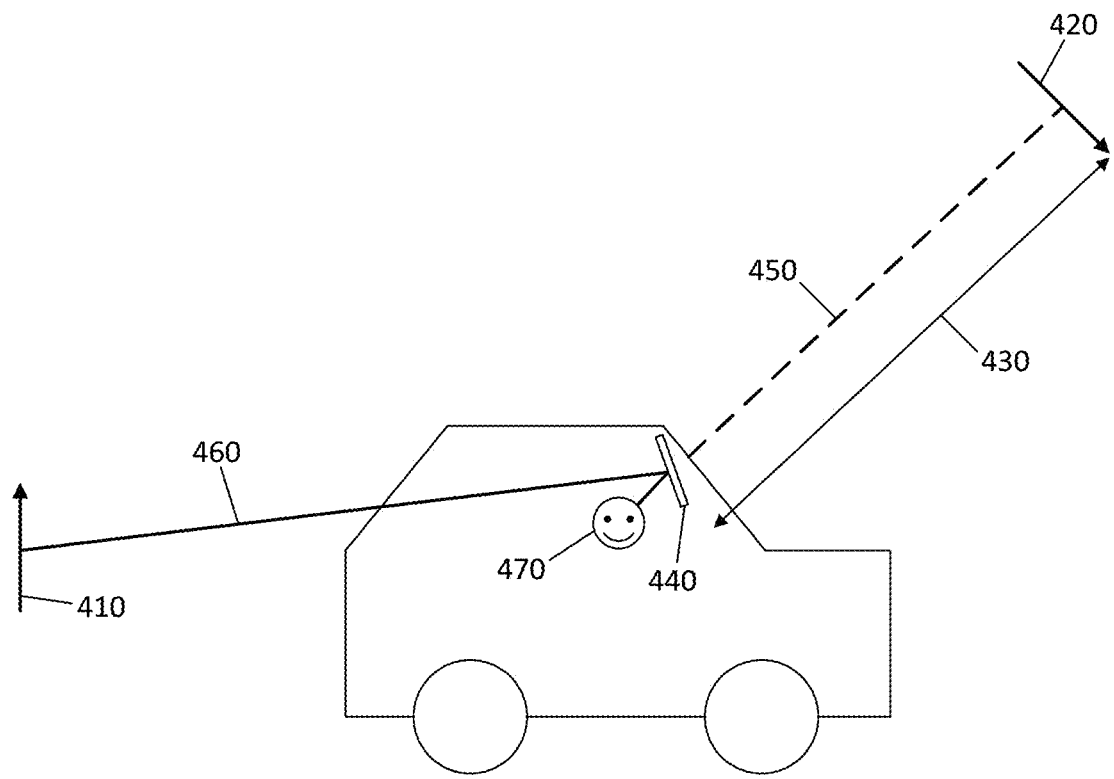
FIG. 4 shows a schematic side view of a driver of a vehicle using a conventional rear view mirror of a vehicle for observing rear view images.

FIG. 4 shows a schematic side view of a driver 470 of a vehicle using a conventional rear view mirror 440. Typically, the rear view mirror 440 is a substantially planar mirror and is mounted inside the vehicle about 30 centimetres in front of the driver 470 just above the driver's head. As shown in FIG. 4, an unimpeded line of sight 460 exists between the rear view mirror 440 and an object 410 in the rear view behind the vehicle, and so the rear view mirror 440 forms a virtual image 420 of the object 410 as shown by dashed line 450. The object 410 and the virtual image 420 have substantially the same size. The virtual image 420 is observed by the driver 470. As described herein, the observation of images by a driver is at an "eye box" or "eye box region". The distance 430 between the mirror 440 and the virtual image 420 is substantially the same as the distance of the line of sight 460 between the mirror 440 and the object 410. Thus, the virtual image 420 has a far focal point/distance, consistent with human "distance vision" (i.e. the focal length of the human eye is relatively long—typically more than about 60 centimetres). It may be said that the virtual image 420 is at a distance greater than or equal to the hyperfocal distance of the human eye.

Accordingly, when using a conventional rear view mirror, the driver 470 can easily alternate between viewing the virtual image 420 of the rear view in the mirror 440 and the front view through the transparent front windscreen. In particular, since both the front view through the windscreen and the rear view in the mirror 440 have a largely similar far focal point/distance, switching between the views requires little, if any, refocusing by the driver's eyes. However, when using the conventional rear view mirror 440, the line of sight 460 to the object 410 in the rear view must be unimpeded. This may not always be possible in the presence of an obstruction inside or outside the vehicle, including on the rear windscreen.

Figure 5:
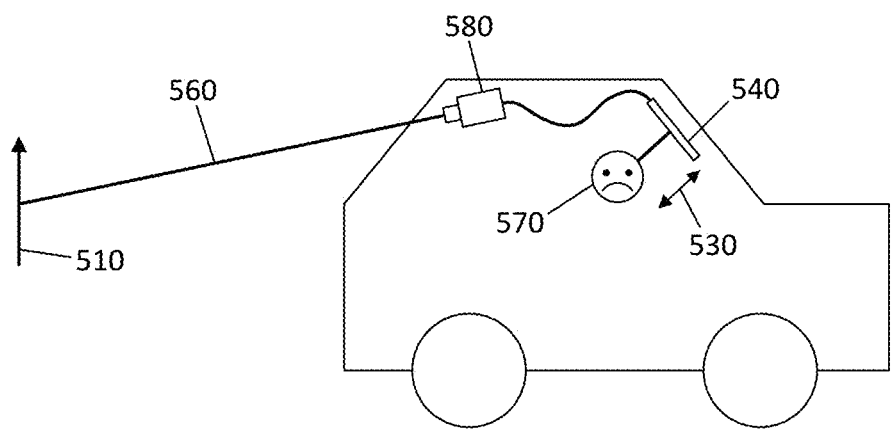
FIG. 5 shows a schematic side view of a driver of a vehicle using a display for observing rear view images, wherein the display is arranged to display images captured by a rear view camera.

FIG. 5 shows a schematic side view of a driver 570 using a display 540 instead of a conventional rear view mirror. In particular, a display 540, which is located at a similar position to the rear view mirror 440 of FIG. 4, display images (e.g. video images) captured by a rear view camera 580. The rear view camera 580 may be mounted inside or outside the vehicle at a position that provides an unimpeded line of sight 560 to an object 520 in the rear view behind the vehicle. The driver 570 observes a real image of the object 520 displayed on the display 540.

However, since the display 540 is located relatively close to the driver's eyes, the real image observed on the display 540 has a near focal point/distance consistent with human "near vision" (i.e. the focal length of the human eye is relatively short—typically up to about 30 centimetres). Thus, the driver needs to alternate between near vision, when viewing the real image of the rear view displayed on the display 540 having a near focal point/distance (typically up to 30 centimetres), and the distance vision when viewing the front view through the front windscreen having a far focal point/distance (typically 2-5 metres). In particular, switching between the views requires refocusing by the driver's eyes to adjust to their different focal points/distances. This can adversely affect the driver's viewing experience, for instance by causing vision problems and eyestrain. In particular, repeatedly alternating between near and distance vision may cause the driver to suffer eyestrain.

Moreover, in the case of driver's requiring eyesight correction and wearing spectacles (or contact lenses) with single vision distance lenses, the rear view displayed on the display screen may not be clear to the driver. Finally, refocusing by the driver's eyes takes time, during which the driver is effectively blind. This is called the "blind flight time" and should be minimised for safety reasons. Accordingly, the blind flight time undesirably increases when viewing the rear view using the display 540 of FIG. 5 with a near focal point/distance, instead of the rear view in the conventional rear view mirror 440 of FIG. 4 with a far focal point/distance.

The inventor has recognised that a projection system may be used to provide an improved imaging system for a driver to observe a rear view of a vehicle. In particular, a projection system is arranged to receive rear view images captured by a rear view camera having an unimpeded line of sight behind the vehicle, and display corresponding pictures on a "display plane". In embodiments, the projection system is a holographic projection system, as described above. Under the control of a holographic controller, a spatial light modulator (SLM) illuminated by a light source is sequentially encoded with the holograms corresponding to images received from the camera so as to display corresponding pictures. The holographic projector is arranged to form pictures corresponding to the captured rear view images as holographic images at a replay plane or "display plane" in real time.

In accordance with the present disclosure, an optical element, having optical power defining a focal length f, is disposed in front of the display plane of the projector. It may be said that the optical element is disposed "downstream" of the display plane. The distance between display plane and the optical element is less than the focal length f of the optical element. It may be said that the display plane is within the focal length f of the optical element. Accordingly, the optical element forms a virtual image of each picture (e.g. holographic image) formed at the display plane. The virtual image can be viewed by a driver from an eye box region within the vehicle. The virtual images of the pictures formed by the optical element are magnified and formed at a distance from the optical element further away than the distance from the display plane. Thus, the virtual images appear to the driver to be further away than the pictures (real images) actually are, in reality. It may be said that the virtual images appear "upstream" of the display plane. Accordingly, the virtual images of the pictures of the rear views viewed by the driver have a far focal point/distance similar to the far focal point/distance of the driver's front views through the front windscreen (typically 2-5 metres). Thus, the driver has a similar viewing experience to that of viewing a conventional rear view mirror. However, the risk of obstructions impeding the line of sight is mitigated, whilst viewing problems and the risk of eyestrain are avoided.

There is provided an image capture and display system arranged to form images of outside a vehicle for viewing from an eye box region within the vehicle. The system comprises an image capture device arranged to be mounted to the vehicle, wherein the image capture device is arranged to capture images outside the vehicle. The system further comprises a picture generating unit arranged to display pictures on a display plane. Each picture is a respective image captured by the image capture device. The system further comprises an optical element having optical power. The optical element is disposed at distance from the display plane less that the focal length of the optical element, such that a virtual image of each picture is formed by the optical element. The virtual image of each picture can be viewed from the eye box region within the vehicle.

In some embodiments, the picture generating unit is a holographic projector arranged to holographically project the pictures onto a replay plane. For example, the holographic projector may comprise a spatial light modulator (e.g. LCOS SLM as described herein) and a light source for illuminating the SLM. The SLM is encoded to display holograms and outputs spatially modulated light to form the holographic images corresponding to the pictures at the replay plane. Thus, the replay plane forms a display plane. In some examples, a screen such as a diffuser may be disposed at the replay plane, with the diffuser disposed within the focal length of the optical element. The optical element forms virtual images of the real images/pictures formed on the diffuser at the replay plane. The diffuser may reduce laser speckle and increase the size of the eye box region. In other examples, a diffuser is not provided at the replay plane and the pictures (i.e. holographic images) are formed in free space. The optical element forms virtual images of the pictures formed at the replay plane and the driver's eyes may focus on the virtual images at a far focal point/distance.

Figure 6:
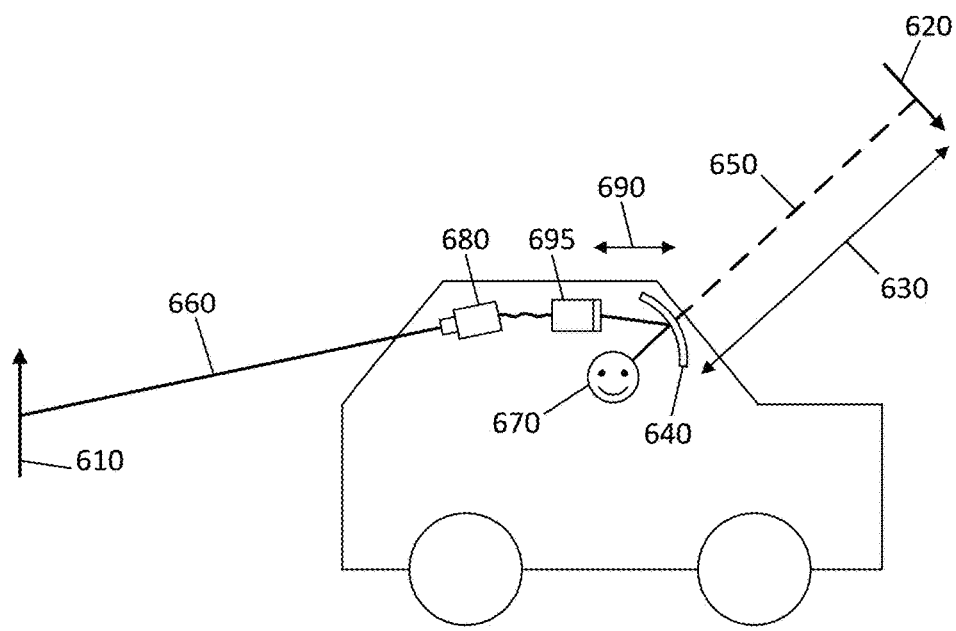
FIG. 6 shows a schematic side view of a driver of a vehicle using an image capture and display system for observing rear view images in accordance with embodiments.

FIG. 6 shows a schematic side view of a driver 670 using an image capture and display system in accordance with embodiments. The image capture and display system comprises a holographic projector arranged to display pictures in the form of holographic images, corresponding to images captured by a rear view camera. In particular, a rear view camera 680 captures images of an object 610 in a rear view behind a vehicle and provides the captured images to a holographic projector 695. The rear view camera 680 may be mounted inside or outside the vehicle at a position with an unimpeded line of sight 660 to the object 610 in the rear view. The holographic projector 695 is arranged to form pictures, corresponding to the rear view images (e.g. video images) received from the camera 680, as holographic images at a replay plane. For the purposes of illustration, in the present example, the replay plane is positioned at the front surface of projector 695.

An optical element comprising a concave mirror 640 having optical power defining a focal length f is disposed (more specifically, optically-disposed) between the viewer and the display plane. As the skilled person will appreciate, in other embodiments the optical element may be a lens or equivalent optical component or group of components having optical power. Concave mirror 640 may be located in a similar position within the vehicle to the central rear view mirror 440 of FIG. 4, or at another convenient position for viewing at an eye box region by the driver. For example, in the case that holographic projector 695 displays a rear view from the side of the vehicle, concave mirrors 640 may be positioned in front of the eye box region inside the vehicle to each side, and the conventional wing mirrors may be omitted from the exterior of the vehicle for improved aerodynamics and aesthetics of the vehicle.

Figure 6A:
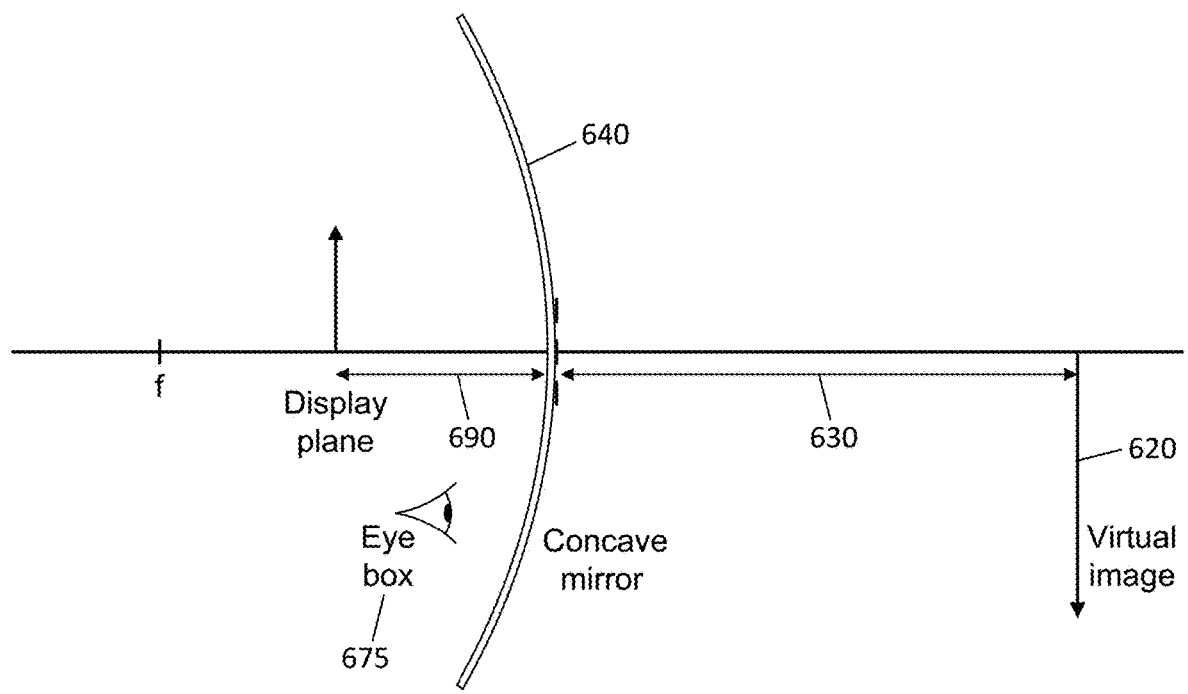
FIG. 6A shows elements along the principle optical axis of the system of FIG. 6.

Referring to FIG. 6A, in accordance with the present disclosure, the distance 690 between the replay plane and the concave mirror 640 is less than the focal length f of the mirror 640 (i.e. distance 690<f). It may be said that the replay plane or "display plane" of the holographic projector 695 is located within the focal length f of the concave mirror 640. Thus, referring again to FIG. 6, the mirror 640 forms a virtual image 620 of the picture formed at the display plane. The amount of magnification of the virtual image 620, and the distance 630 at which the virtual image 620 is focused behind the mirror 640, is dependent upon the properties of the concave mirror 640, such as the optical power. Thus, the properties of the concave mirror 640 may be selected according to design requirements. The distance 630 from the virtual image 620 to the concave mirror 640 is greater than the distance from the display plane to the concave mirror 640. For instance, the distance 630 may be similar to the distance of line of sight 660 from the camera 680 to the object 610. The driver 670 observes the virtual image 620 of the object 610 in the picture from an eye box region 675 within the vehicle. Since the virtual image 620 is focused at a distance 630 from the mirror 640 that is greater that the distance 690 of the display plane from the mirror 640, the virtual image appears further away than the picture on the display screen actually is in reality. It may be said that the virtual image appears to the driver to be "upstream" of the display plane.

Accordingly, there is provided a method of forming images of outside a vehicle for viewing from an eye box region within a vehicle. The method comprises capturing, by an image capture device mounted to the vehicle, images outside the vehicle. The method further comprises forming pictures on a display plane, wherein each picture corresponds to an image captured by the image capture device. Finally, the method comprises forming, by an optical element, a virtual image of each picture displayed in the replay plane for viewing from the eye box region. The optical element has optical power and a focal length. The optical element is disposed in front of the replay plane so that the distance between the display plane and the optical element is less that the focal length of the optical element.

Returning to FIG. 6A, the distance 630 between the mirror 640 and the virtual image 620 is greater than the distance 690 between the mirror 640 and the display plane of the holographic projector 695. Thus, the virtual image 620 has a far focal point/distance to the driver's eye box region consistent with human "distance vision". For example, the distance to the virtual image 620 from the eye box region 675 is greater than 1.5 metres, optionally greater than 2 metres such as greater than 3 or 5 metres. Therefore, the driver can easily alternate between viewing the virtual image 620 of the rear view (i.e. the picture including object 610) in the mirror 640 and the front view through the front windscreen. In particular, since both the front view through the windscreen and the rear view in the mirror 640 have a largely similar far focal point/distance (typically 1.5-5 metres) no significant refocusing by the driver's eyes is required when alternating between the views. Similarly, drivers requiring eyesight correction can see both views clearly using spectacles (or contact lenses) with single vision distance lenses.

System Configuration

Figure 7:
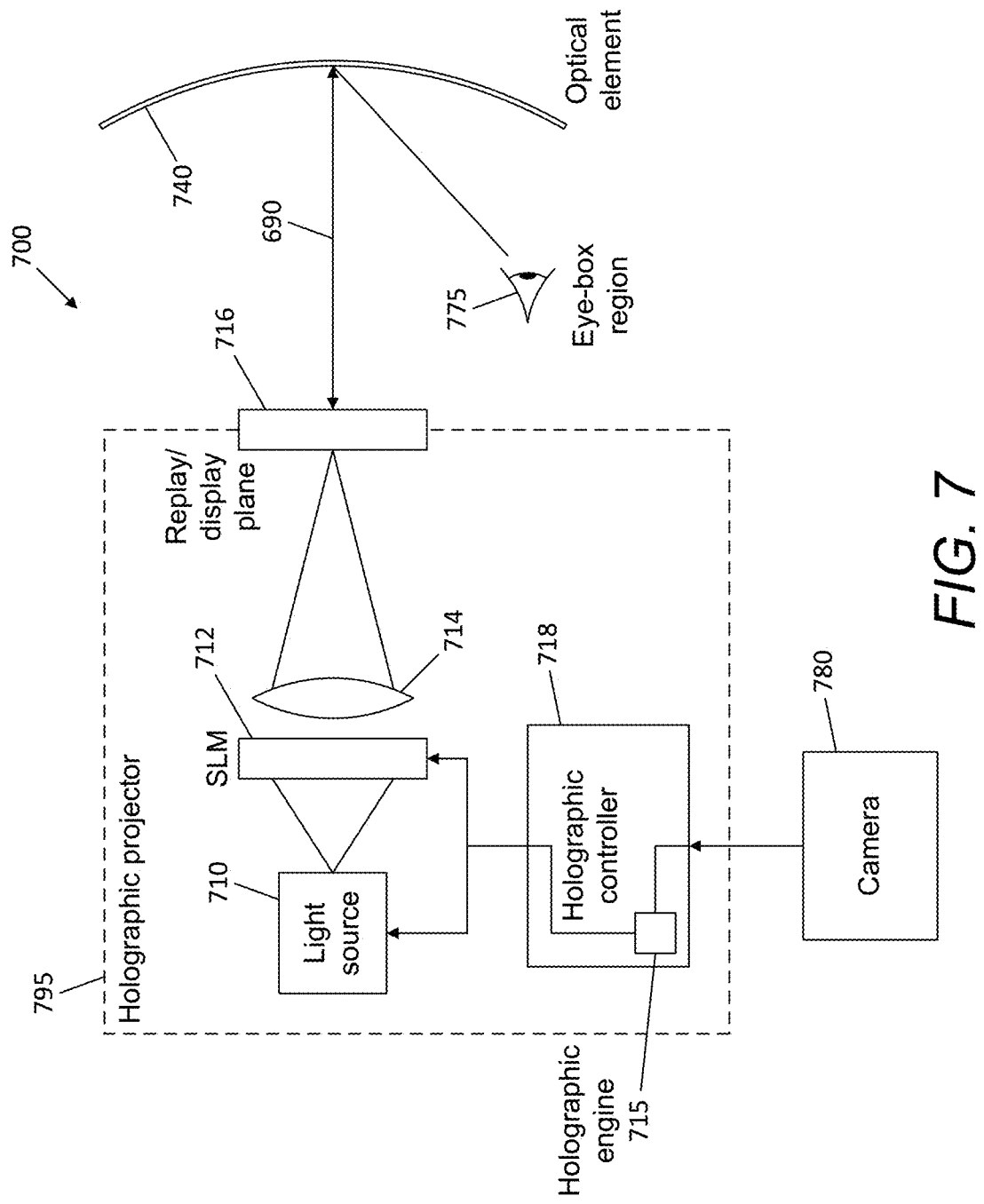
FIG. 7 shows a schematic block diagram of an image capture and display system in accordance with embodiments.

FIG. 7 is a schematic diagram of an image capture and display system 700 according to an embodiment. The image capture and display system 700 comprises a holographic projector 795 having a light source 710, a spatial light modulator 712 (e.g. LCOS SLM as described herein), a Fourier optic 714 and a replay plane 716. In addition, holographic projector 795 comprises a holographic controller 718 which controls the light source 710 and SLM 712. In the illustrated embodiment, SLM 712 is a transmissive spatial light modulator and Fourier optic 714 is a physical lens. In other embodiments, a reflective spatial light modulator may be used, and/or the Fourier optic 780 may be replaced by a software lens or "lensing data", as described herein. Light source 710 typically comprises a laser light source that provides coherent light incident on SLM 712. In the illustrated embodiment, a single light source 710 is used for providing monochrome images. In other embodiments, a plurality of light sources may be used to provide colour images, as described further below.

As in the arrangement of FIG. 1, SLM 712 is encoded with holographic data to display holograms and is illuminated by light from light source 710. Thus, SLM 712 outputs spatially modulated light to form holographic images/pictures at replay plane 716. It may be said that pictures reconstructed from holograms displayed on SLM 712 are projected onto the replay plane 716, which forms a display plane where pictures are formed. The pictures formed at the replay plane 716 correspond to the images captured by camera 780. In particular, holographic controller 718 receives real-time images (e.g., a video stream) from camera 780. A hologram engine 715 calculates computer-generated holograms corresponding to the received images, as described above. Holographic controller 718 encodes SLM 712 with the calculated computer-generated holograms in real time.

An optical element 740, having optical power defining a focal length f, is disposed along the optical path or axis of the holographic projector 795 in front of the replay plane 716. As described herein, in accordance with the present disclosure, the distance 690 between the replay plane 716 and the optical element 740 is less than the focal length f of the optical element 740. Thus, optical element 740 forms virtual images of the real time pictures formed at the replay plane 716 by the holographic projector 795. The virtual images (not shown in FIG. 7) are formed behind the optical element 740 at a far focal point/distance, as described herein. A driver can view the virtual images formed by the optical element 740 from an eye box region 775 in front of the optical element 740.

ALTERNATIVE EMBODIMENTS

Embodiments described above use a holographic projector to form pictures by way of example only. Other picture generating units may be used to form the pictures. An arrangement that uses a holographic projector has greater design flexibility, for instance it can be arranged in a variety of different configurations, whether with or without a diffuser, and provides high imaging quality with reduced power. However, other embodiments use a conventional (e.g. backlit) display device such as an LCD. In such embodiments, the pictures are displayed by illuminating pixels on a display screen. Thus, the display screen itself forms a display plane equivalent to the replay plane of the holographic projector. In other words, in these other embodiments, the pictures are not projected onto a plane away from the device. The display screen is disposed within the focal length f of the optical element (i.e. at a distance in front of the optical element less that the focal length thereof) so that virtual images of the pictures are formed for viewing by the driver, as described above.

In the illustrated embodiments, the optical element is a mirror that replaces a conventional rear view mirror (e.g. central rear view mirror or wing mirror) as described with reference to FIG. 4. An arrangement that uses a mirror is compact, familiar to a driver and provides the necessary optical turn to enable viewing of the virtual images by the driver. However, in other embodiments, the optical element comprises a simple lens with the requisite optical power to form virtual images of objects (i.e. pictures) located within its focal length. A planar mirror or other optical component(s) may be used to provide the optical turn to enable the virtual images to be directed towards the eye box region of the driver for viewing.

In still further embodiments, the optical element may be configured as a so-called combiner like that found in a combiner HUD. The optical element has optical power defining a focal length, and the display plane is located within its focal length as in the embodiments described above. However, the combiner may be switched between two states. In a first state, the combiner is completely transparent, and the virtual images formed by the optical element are not visible to the driver. It may be said that the virtual images (e.g. holographic images) are switched off. Thus, the driver sees only the real world front view through the transparent optical element/combiner and the transparent front windscreen. In a second state, the combiner is made opaque, and the virtual images formed by the optical elements are visible to the driver. It may be said that the virtual images (e.g. holographic images) are switched on. Thus, the driver sees only the virtual images formed by the optical element, and the real world front view is not visible through the optical element. Switching the combiner between the first and second states may be achieved through the use of polymer dispersed liquid crystal, as described, for example, in British patent publication GB2526158A.

Method of Operation

Figure 8:
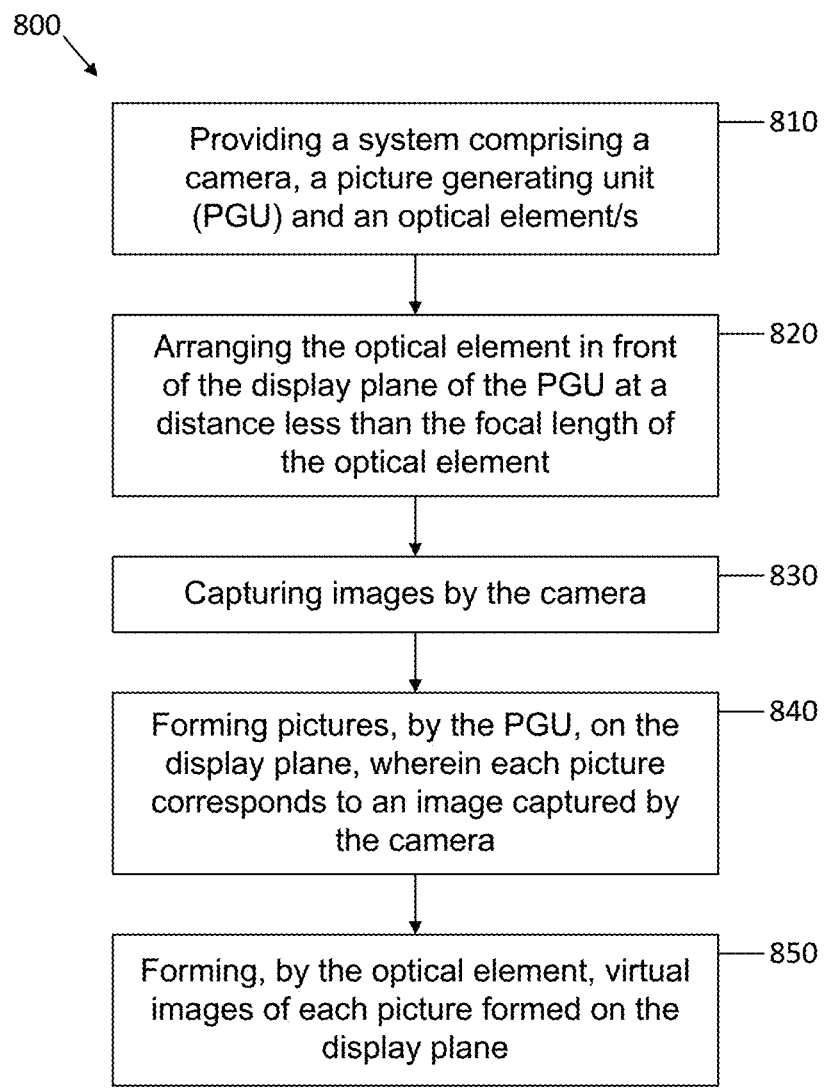
FIG. 8 shows a block diagram of a method in accordance with embodiments.

FIG. 8 shows a block diagram of a method 800 of forming images of outside a vehicle for viewing from an eye box region within a vehicle. The method 800 may use an image capture and display system in accordance with the embodiments described herein.

Block 810 comprises providing an image capture and display system comprising a camera, a picture generating unit having a display plane and an optical element having optical power defining a focal length. In some embodiments, the picture generating unit is a holographic projector and the display plane is a holographic replay plane.

Block 820 comprises arranging the optical element in front of the display plane at a distance less than the focal length of the optical element. In some embodiments, the optical element is a concave mirror.

Block 830 comprises capturing images by the camera. The camera may be arranged to capture images outside a vehicle, such as rear view images, and to provide the captured images (e.g. a video stream) to the picture generating unit.

Block 840 comprises forming pictures, by the picture generating unit, on the display plane, wherein each picture corresponds to an image captured by the camera. In embodiments comprising a holographic projector, the picture generating unit receives the captured images from the camera and calculates corresponding computer-generated holograms, which are displayed by a spatial light modulator. The spatial light modulator is illuminated by a light source, and each picture is formed on the display plane (i.e. a replay plane) by holographic reconstruction.

Block 850 comprises forming, by the optical element, virtual images of each picture formed on the display plane. The virtual images can be viewed from an eye box region within a vehicle. In embodiments, in which the optical element is a mirror, the virtual images can be viewed by looking in the mirror.

Additional Features

Embodiments described herein may comprises an electrically-activated LCOS spatial light modulator. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode that produces coherent light. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. Colour images are desirable to resemble a driver's existing viewing experience of rear view images when using a conventional rear view mirror. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

Whilst the described embodiments refer to an image capture and display system that forms images of rear views outside a vehicle, the present disclosure is not limited to rear view images. The image capture and display system and method of the present disclosure may be used to form images of any view or location outside a vehicle or in any other scenario that would benefit from the teachings disclosed herein. In addition, the described image capture and display system may be equally applicable to non-automotive applications, for example where it is desirable to overlay virtual content onto a mirror image whilst maintaining a far focal point/distance of the virtual image.

The methods and processes described herein may be embodied on a computer-readable medium. The term "computer-readable medium" includes a medium arranged to store data temporarily or permanently such as randomaccess memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A system arranged to form images of outside a vehicle for viewing from an eye box region within the vehicle, the system comprising:
    an image capture device arranged to be mounted to the vehicle, wherein the image capture device is arranged to capture images outside the vehicle;
    a holographic projector arranged to form pictures on a replay plane, wherein each picture corresponds to an image captured by the image capture device, and
    an optical element disposed in front of, and downstream of, the replay plane, the optical element having a focal length, wherein the distance between the replay plane and the optical element is less than the focal length of the optical element such that the optical element forms a virtual image of each picture for viewing from the eye box region;
    wherein the optical element comprises a concave mirror arranged inside the vehicle in front of the eye box region such that the virtual image of each picture is viewable in the mirror.

2. The system of claim 1 wherein the virtual image of each picture is formed by the optical element such that a distance to the virtual image from the eye box region is consistent with distance vision of the human eye.

3. The system of claim 1 wherein the virtual image of each picture is formed by the optical element such that a distance to the virtual image from the eye box region that is greater than or equal to the hyperfocal distance of the human eye.

4. The system of claim 1, wherein the virtual image of each picture is formed by the optical element such that a distance to the virtual image from the eye box region is greater than 2 metres.

5. The system of claim 1 wherein the holographic projector comprises:
    a spatial light modulator arranged to display a hologram; and
    a light source arranged to illuminate the spatial light modulator such that a holographic reconstruction of the hologram is formed on the replay plane,
wherein the holographic projector is arranged to receive images from the image capture device and to encode the spatial light modulator with holograms corresponding to the captured images.

6. The system of claim 5 wherein the holographic projector is arranged to receive an image captured by the image capture device and to calculate a hologram corresponding to the image.

7. The system of claim 5 wherein the holographic projector further comprises a screen, positioned at the replay plane, wherein a real image of each picture is formed on the screen.

8. The system of claim 1 wherein the image capture device is arranged to capture rear view images from the vehicle.

9. The system of claim 1 wherein the optical element is switchable between a transmissive state and an opaque state.

10. The system of claim 9 wherein:
    the optical element is transparent in the transmissive state such that the virtual image of each picture cannot be seen from the eye box region, and
    the optical element is opaque in the opaque state such that the virtual image of each picture can be seen from the eye box region.

11. The system of claim 1 wherein the system is a driver assistance system.

12. A vehicle comprising the system of claim 1.

13. A method of forming images of outside a vehicle for viewing from an eye box region within a vehicle, the method comprising:
    capturing, by an image capture device mounted to the vehicle, images outside the vehicle;
    displaying, by a holographic projector, pictures on a replay plane, wherein each picture corresponds to an image captured by the image capture device, and
    forming, by an optical element, a virtual image of each picture displayed in the replay plane for viewing from the eye box region, wherein the optical element has a focal length and wherein the optical element is disposed in front of, and downstream of, the replay plane so that the distance between the display plane and the optical element is less than the focal length of the optical element, wherein the optical element comprises a concave mirror arranged inside the vehicle in front of the eye box region such that the virtual image of each picture is viewable in the mirror.

14. The method of claim 13, wherein displaying the pictures on the replay plane comprises:
    receive images from the image capture device and encoding a spatial light modulator with holograms corresponding to the images;
    displaying the holograms on a spatial light modulator; and
    illuminating the spatial light modulator such that holographic reconstructions of the holograms is formed on the replay plane.

15. The method of claim 14, wherein encoding the spatial light modulator with the holograms corresponding to the images comprises calculating holograms corresponding to the images.

16. The method of claim 13, wherein the images outside the vehicle are rear view images.

17. The method of claim 13, further comprising switching the optical element between a transmissive state and an opaque state.

18. The method of claim 17, wherein:
    the optical element is transparent in the transmissive state such that the virtual image of each picture cannot be seen from the eye box region, and the optical element is opaque in the opaque state such that the virtual image of each picture can be seen from the eye box region.

\* \* \* \* \*